Aug. 5, 1969  C. E. COLE  3,459,844
WET PELLETING OF CARBON BLACK
Filed Aug. 16, 1967
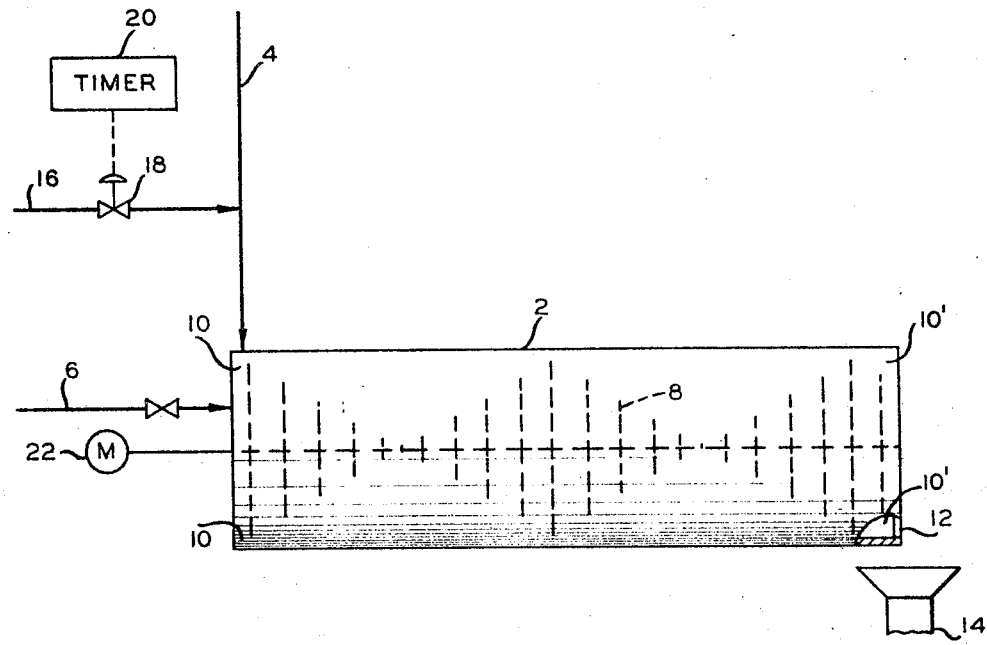
INVENTOR.
C. E. COLE
BY Young & Quigg
ATTORNEYS

United States Patent Office 3,459,844
Patented Aug. 5, 1969

3,459,844
WET PELLETING OF CARBON BLACK
Clinie E. Cole, Borger, Tex., assignor to Phillips Petroleum Company, a corporation of Delaware
Filed Aug. 16, 1967, Ser. No. 660,972
Int. Cl. C09c 11/58
U.S. Cl. 264—117          7 Claims

ABSTRACT OF THE DISCLOSURE

In the wet pelleting of carbon black, a small quantity of liquid hydrocarbon material is periodically added to the carbon black pelleting zone to dislodge the build-up of carbon black in the pelleting zone.

---

In the wet pelleting of carbon black in a conventional wet pelleter such as that disclosed in Heller et al., U.S. 2,306,698, carbon black has a tendency to build up near the inlet and at the outlet end of the pelleter. This buildup of carbon black is deleterious to the operation since the buildup can clog the feeding of the carbon black to the pelletizer or the discharging of carbon black pellets from the discharge end of the pelletizer. The alteration in the flow pattern and residence time caused thereby adversely affects the physical properties of the carbon black pellets formed. In order to overcome this problem, the pelletizer must be shut down and cleaned out periodically, for example, every 8 hours. This closing down of the carbon black pelletizer causes a loss in efficiency of the operation and due to the fact that upon start-up after cleaning, operation is erratic for several minutes and much unpelleted material is discharged from the pelleter.

I have now discovered that the buildup of carbon black within the wet pelletizer at the inlet end and the discharge end thereof can be reduced or avoided by periodically injecting a small amount, preferably for example .3 to 1 percent of a liquid hydrocaron material based on the weight of the carbon black entering the pelletizer.

By various aspects of this invention, one or more of the following or other objects can be obtained.

It is an object of this invention to provide an improved process for wet pelletizing carbon black.

It is a further object of this invention to avoid shutdown of a carbon black pelletizer in the wet pelletizing of carbon black due to the buildup of carbon black at the inlet end and discharge end of the pelletizer.

It is a still further object of this invention to prevent the buildup of carbon black within a pelletizing zone in a wet pelletizing operation.

Other aspects, objects, and the several advantages of this invention are apparent to one skilled in the art from a study of this disclosure, the drawing, and the appended claims.

According to the invention, a small amount of liquid hydrocarbon material is added periodically to the feed to a carbon black pelletizer in the wet pelletizing operation. The amount of liquid hydrocarbon material added is sufficient to dislodge built up carbon black in the pelletizing zone but insufficient to appreciably effect the quality of the pelleting operation. Generally, the amount of liquid hydrocarbon material will be in the range of 0.3 to 3 percent, preferably .3 to 1 percent based on the weight of carbon black entering the carbon black pelleting zone.

The type of liquid hydrocarbon used can be any suitable liquid hydrocarbon or substituted liquid hydrocarbonaceous material boiling initially in the range of 300° F. to 600° F., preferably having an API gravity (ASTM D 287–55) in the range of 8 to 45. Examples of suitable materials include kerosene having an API gravity (ASTM D 287–55) in the range of 40–45 and $SO_2$ extract oil having an API gravity (ASTM D 287–55) in the range of 8–20.

Generally, the liquid hydrocarbon material is added to the carbon black pelleting zone when buildup of carbon black occurs at the inlet end and at the discharge end thereof. The time at which the buildup occurs will vary from operation to operation but generally will be in the range of 6 to 24 hours, preferably in the range of 8 to 15 hours. A suitable period for injecting liquid hydrocarbon material is every 8 hours.

The length of time for which the liquid hydrocarbon material is added to the carbon black pelleting zone will vary depending on the operation. Generally the length of time will be sufficient to dislodge accumulated carbon black materials at the inlet end and discharge end of the carbon black pelletizer but will not be sufficient to appreciably effect the quality of the pelleting operation. Preferably, the length of time for which the liquid hydrocarbon material is added will be in the range of 30 seconds to 25 minutes, preferably from 3 to 10 minutes.

The invention will now be described with reference to the accompanying drawing which schematically shows an embodiment of the invention.

Referring now to the drawing, a carbon black pelletizer 2 having a plurality of long rods or pins 8 mounted on a rotating shaft serves to pelletize the carbon black entering through line 4. The rotating shaft is driven by motor 22. Water, added through line 6, at a metered rate, aids in the pelleting operation. The pelletized carbon black is removed through outlet opening 12 and is collected in conduit 14. During normal operation of the pelletizer, carbon black builds up in the corners, such as 10 and 10' near the inlet and discharge ends, respectively, of the pelletizer.

According to the invention, when carbon black builds up in corners 10 and 10', for example, valve 18 is opened, for example, by timer 20, to allow a liquid hydrocarbon material to flow through line 16 in admixture with carbon black in line 4. The valve 18 is only open for a short period of time, sufficient to dislodge built up carbon black in areas 10 and 10' in the carbon black pelletizer.

In the event that a small quantity of pellets is affected by the addition of oil, these pellets can be recycled as is well known by one skilled in the art.

The following is a specific example of the invention.

In the conventional manner of manufacturing carbon black pellets, the pelletizer is shut down every eight hours and manually cleaned.

In one run, in the manufacture of carbon black pellets, 1 percent of kerosene was added for 5 minutes to the carbon black feed stream to the pelletizer. This procedure was repeated every 8 hours. When the pelletizer was opened up and inspected, there was no buildup of carbon black at the inlet and discharge ends of the pelletizer. Over a 10 day period, when the injection was made every 8 hours, the product was found to be uniform and the pelletizer operated without erratic operation.

During the operation of the invention, the quality of the pellets from the pelletizer was not appreciably changed.

I claim:
1. In a method for wet pelletizing carbon black in which carbon black and water are fed into a pelletizer having an inlet end and a discharge end, the improvement comprising periodically adding to said carbon black being fed a quantity of liquid hydrocarbon material in a sufficient amount to cause dislodging of carbon black buildup in said pelletizer, but an insufficient amount to cause appreciable change in the pelletizing method.

2. A method for wet pelleting carbon black according to claim 1 wherein said liquid hydrocarbon material is added at a rate of .3 to 1 percent based on the weight of carbon black entering said pelleting zone.

3. A method for wet pelleting carbon black according to claim 2 wherein said liquid hydrocarbon material is added for a time in the range of 30 seconds to 5 minutes every 6 to 24 hours.

4. A method for wet pelletizing carbon black according to claim 1 wherein said liquid hydrocarbon material has an initial boiling point in the range of 300° F. to 600° F. and has an API gravity in the range of 8 to 45.

5. A method for wet pelletizing carbon black according to claim 4 wherein said liquid hydrocarbon material is kerosene.

6. A method for wet pelletizing carbon black according to claim 4 wherein said liquid hydrocarbon material is $SO_2$ extract oil.

7. A method for wet pelletizing carbon black according to claim 1 wherein said liquid hydrocarbon material is added at a time at which the carbon black builds up in said inlet end and said discharge end of said pelletizer.

References Cited
UNITED STATES PATENTS

| 2,699,381 | 1/1955 | King | 264—117 |
| 2,942,299 | 6/1960 | Larson | 264—117 |

ROBERT F. WHITE, Primary Examiner

J. R. HALL, Assistant Examiner

U.S. Cl. X.R.

201—2